(No Model.)
D. REYNOLDS.
COLTER.
No. 395,250. Patented Dec. 25, 1888.
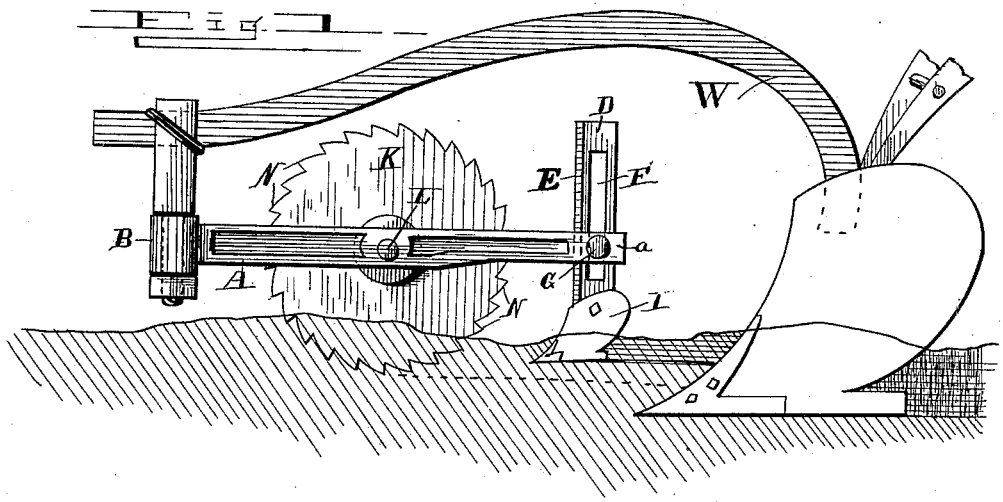
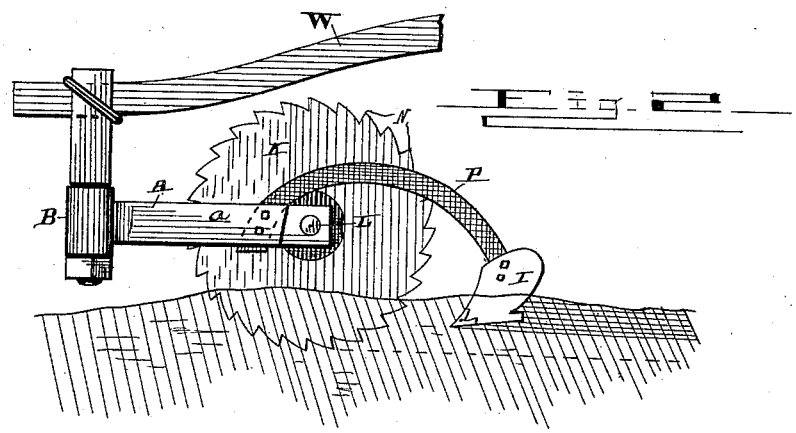
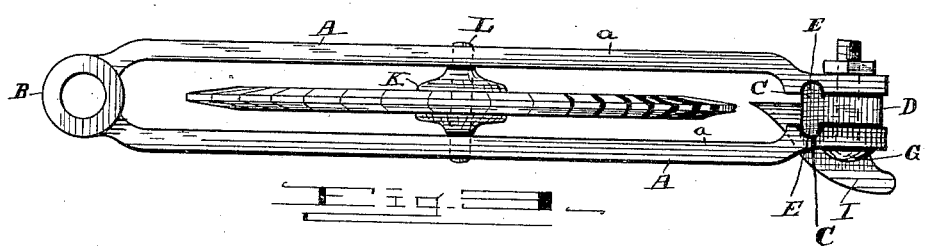
Witnesses
P. L. Brooks.
A. E. Dowell
Inventor
D. Reynolds
By his Attorney
T. H. Alexander

UNITED STATES PATENT OFFICE.

DANIEL REYNOLDS, OF CROTON, OHIO.

COLTER.

SPECIFICATION forming part of Letters Patent No. 395,250, dated December 25, 1888.

Application filed September 14, 1888. Serial No. 285,378. (No model.)

*To all whom it may concern:*

Be it known that I, DANIEL REYNOLDS, of Croton, in the county of Licking and State of Ohio, have invented certain new and useful Improvements in Colters; and I do hereby declare that the following is a full, clear, and exact description thereof, reference being had to the accompanying drawings, and to the letters of reference marked thereon, which form part of this specification.

This invention relates to certain improvements in that class of cultivators or agricultural implements to be employed in marshy ground or ground having a sodded surface; and it has for its objects to provide for cutting the sod and the remains of former crops—such as large cornstalks, broom-corn, as well as weeds and other vegetable obstructions—and to open the ground thus cleared; and to this end my invention consists in a revolving colter and jointer combined, and especially adapted for attachment to an ordinary plow, as more fully hereinafter described and claimed.

The above-mentioned objects I attain by the means illustrated in the accompanying drawings, in which—

Figure 1 represents a side elevation of a plow having my improvements attached. Fig. 2 is a similar view illustrating a modification. Fig. 3 is a top plan view of the attachment detached.

This invention is an improvement in colters and jointers for plows and cultivators; and it consists in the novel construction and combination of parts hereinafter set forth.

Referring by letter to the drawings, W designates an ordinary plow.

A designates a bifurcated frame, on the front end of which is a perforated boss, B, by which the frame is pivotally attached to a stud attached to and depending from the plow-beam in front of the plow. The frame is thus permitted to swing laterally beneath the beam.

K designates a revolving colter journaled on a short shaft, L, passing transversely through the frame. This colter is serrated at its periphery, forming teeth N N, which are sharpened and adapted to cut the sod and refuse vegetable growths to open and line the path for the jointer and plow.

I indicates the jointer, which is of suitable construction, and is fixed on the lower end of a vertical standard, D, which has lateral flanges E E at its front edge, and is vertically slotted at F. Standard D is clamped between the rear ends of bars $a$ of the frame, and the flanges E E enter vertical slots C C in the opposite inner faces of said bars.

G is a bolt passing transversely through the bars $a\ a$ and through the slot F of standard D, and H is a nut thereon by which the parts are clamped. The flanges E E, engaging grooves C, keep the standard vertical and brace it against the strain of work. The standard can be adjusted up or down, as is evident, to raise or lower the jointer. In the modification shown in Fig. 2 the slotted ends of the frame and the standard D are omitted, the jointer being attached to a curved bifurcated beam, P, which straddles the colter.

In operation the colter cuts the line of furrow and the jointer clears the trash from the path of the plow, and the draft of the machine is lessened, while the same depth of furrow is attained by cutting and turning the ground in steps or degrees, instead of doing all the work by the mold-board plow alone.

Having described my invention, what I claim is—

1. The combination of the bifurcated frame A, having vertical grooves C C in the inner faces and rear ends of its side bars, with the vertically-adjustable standard D, having lateral flanges E E engaging grooves C C, the clamping bolt and nut, and the jointer I, all substantially as described.

2. The combination of the frame A, having grooves C C in the inner faces and rear ends of its side bars, and the rolling colter K, mounted in said frame, with the vertically-adjustable standard D, slotted and flanged as described, and the jointer attached to said standard, substantially as and for the purpose specified.

3. The combination of the bifurcated frame A, having a perforated boss, B, at front, and vertically grooved at C C on the inner faces and rear ends of its side bars, and the rotary serrated colter K, mounted on a transverse shaft, L, of the frame, with the vertically-adjustable standard D, having lateral flanges E E on its front edges engaging grooves C C of frame A, and having a slot, F, the clamping bolt and nut, and the jointer attached to said standard, all substantially as specified.

In testimony that I claim the foregoing as my own I affix my signature in presence of two witnesses.

DANIEL REYNOLDS.

Witnesses:
 JERY GRANDSTAFF,
 WILLIAM O. DAVIDSON.